United States Patent [19]

Yoshikawa

[11] Patent Number: 4,942,857
[45] Date of Patent: Jul. 24, 1990

[54] COMBUSTION CHAMBER FOR ENGINE WITH MULTIPLE VALVES

[75] Inventor: Masaaki Yoshikawa, Iwata, Japan

[73] Assignee: Yamaha Hatsudoki Kabushiki Kaisha, Iwata, Japan

[21] Appl. No.: 296,497

[22] Filed: Jan. 12, 1989

[30] Foreign Application Priority Data

Jan. 18, 1988 [JP] Japan ................................. 63-6984

[51] Int. Cl.$^5$ ............................................. F02B 15/00
[52] U.S. Cl. ............................. 123/193 H; 123/308; 123/432
[58] Field of Search ................... 123/193 H, 308, 432, 123/315, 193 CH

[56] References Cited

U.S. PATENT DOCUMENTS

| | | | |
|---|---|---|---|
| 4,116,179 | 9/1978 | Nagumo et al. .................... 123/310 |
| 4,381,749 | 5/1983 | Sugiyama ............................ 123/308 |
| 4,484,550 | 11/1984 | Gadefelt et al. ..................... 123/308 |
| 4,543,929 | 10/1985 | Kataoka et al. ..................... 123/276 |
| 4,741,302 | 5/1988 | Oda et al. ............................ 123/308 |
| 4,770,139 | 9/1988 | Tanaka ................................ 123/308 |
| 4,787,342 | 11/1988 | Matsumori et al. ........... 123/52 MV |

FOREIGN PATENT DOCUMENTS

| | | | |
|---|---|---|---|
| 0197914 | 10/1986 | European Pat. Off. ........ 123/193 P |
| 0216013 | 10/1985 | Japan ............................... 123/193 P |
| 61-118517 | 6/1986 | Japan . | |
| 0282115 | 12/1987 | Japan ............................... 123/193 P |

*Primary Examiner*—David A. Okonsky
*Attorney, Agent, or Firm*—Ernest A. Beutler

[57] ABSTRACT

An improved pent roof configured combustion chamber for an internal combustion engine wherein the pent roof has a generally D configuration in top plan view so as to prevent opposing squish flow and to generate swirls within the combustion chamber as the piston approaches top dead center.

9 Claims, 2 Drawing Sheets

COMBUSTION CHAMBER FOR ENGINE WITH MULTIPLE VALVES

BACKGROUND OF THE INVENTION

This invention relates to a combustion chamber for an engine with multiple valves and more particularly to an improved combustion chamber configuration for an engine.

One particularly popular form of combustion chamber for an internal combustion engine uses a so-called "pent roof" configuration. With this type of combustion chamber, the head or dome of the piston has upwardly tapering side surfaces which extend generally parallel to the heads of the intake and exhaust valves which are disposed on opposite sides of the cylinder bore. It is also a practice to employ a squish area which surrounds the pent roof construction so as to increase turbulence in the combustion chamber during running. Increased turbulence promote rapid flame propagation at low speeds and loads and insures more complete combustion.

Although this combustion chamber configuration has advantages, there are also some disadvantages with the type of pent roof combustion chambers previously proposed. That is, the flow of the gases from the squish area along the inclined opposite sides of the piston head are in generally parallel directions and, hence, the flow from one side directly impinges upon the flow from the other side. This directly opposing flow tends to cause irregular patterns of air and fuel movement within the combustion chamber and undesirable running characteristics. Furthermore, when the intake and exhaust valves are in their overlapping condition, these opposing flows can cause difficulties with volumetric efficiency of the engine.

It is, therefore, a principal object of this invention to provide an improved combustion chamber configuration for an internal combustion engine.

It is a further object of this invention to provide an improved pent roof type combustion chamber for a multiple valve internal combustion engine.

SUMMARY OF THE INVENTION

This invention is adapted to be embodied in a combustion chamber for an internal combustion engine that is comprised of a cylinder bore, a piston reciprocating in the cylinder bore and a cylinder head which closes the cylinder bore and which defines a combustion chamber with the cylinder bore and piston. Intake valve means are disposed on one side of the cylinder bore for admitting a charge to the combustion chamber and exhaust valve means are provided on the other side of the cylinder bore for discharging combustion products from the combustion chamber. In accordance with the invention, the combustion chamber is comprised of a central portion having a pent roof configuration with a peripheral squish area. The combustion chamber is configured so that the squish flow upon approach to top dead center of the piston is such that the flow from one side of the cylinder bore does not directly oppose the flow from the other side of the cylinder bore.

DETAILED DESCRIPTION OF THE PREFERRED EMBODIMENT

Figure 1:
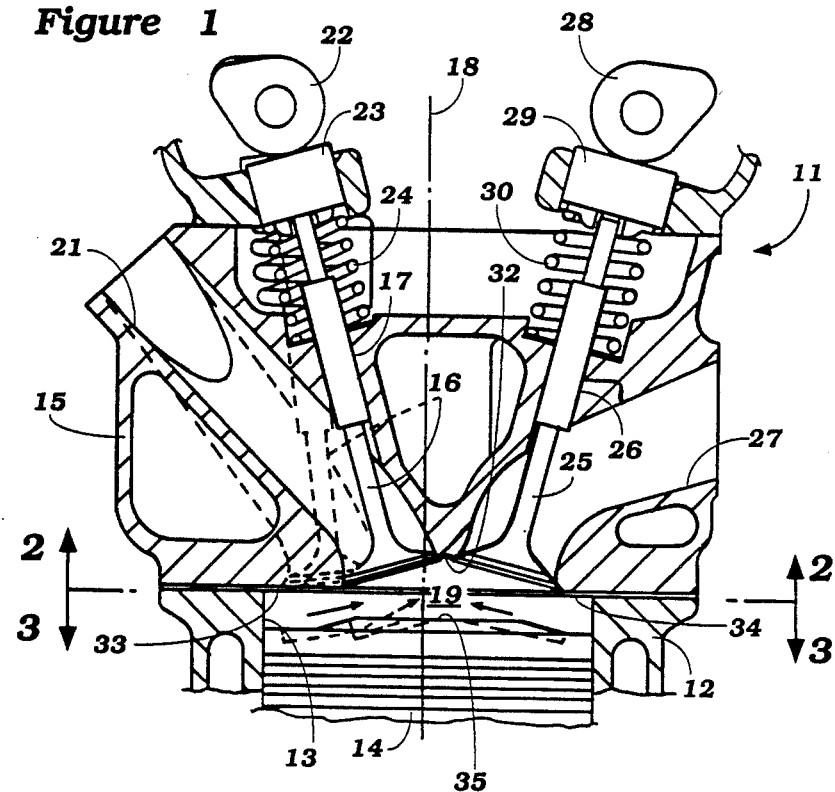
FIG. 1 is a cross-sectional view taken through the combustion chamber of a single cylinder of a multiple cylinder engine constructed in accordance with an embodiment of the invention.

Referring in detail to the drawings, an internal combustion engine constructed in accordance with an embodiment of the invention is identified generally by the reference numeral 11. Inasmuch as the invention relates to the configuration of the combustion chamber for the engine 11, only this portion of the engine has been illustrated and only a single cylinder of the engine has been depicted. It is to be understood that the invention can be employed with reciprocating engines having any number of cylinders or cylinder configurations.

The engine 11 is comprised of a cylinder block 12 having one or more cylinder bores 13 in which pistons 14 are supported for reciprocation. The pistons 14 are connected by means of connecting rods (not shown) to a crankshaft in a known manner.

A cylinder head 15 is affixed to the cylinder block 12 in a known manner and has a plurality of intake valves 16 slidably supported within valve guides 17 generally on one side of a plane 18 that contains the axis of the cylinder bore 13. In the illustrated embodiment, there are employed three intake valves 17 oriented generally as shown in my United States Letters Pat. No. 4,624,222, issued Nov. 25, 1986, entitled "Intake Valve Structure For Internal Combustion Engine, and assigned to the assignee of this application. The intake valves 16 control the flow of an intake charge to a combustion chamber 19 formed between the head of the piston 14, the lower surface of the cylinder head 15 and the cylinder block 13 from intake passages 21 that extend through the intake side of the cylinder head 15. The intake valves 16 are operated by means of an intake camshaft 22 that is rotatably journaled in the cylinder head 15 and which operates the intake valves 16 via thimble tappets 23. Coil compression springs 24 urge the intake valves 16 to their closed position.

A pair of exhaust valves 25 have their stems slidably supported in valve guides 26 on the side of the plane 18 opposite to the intake valves 16. It should be noted that the heads of two of the valves 16 slightly overlie the plane 18, as described in my aforenoted patent. The exhaust valves 25 control the flow of combustion products from the combustion chamber 19 through exhaust ports 27 to a suitable exhaust system (not shown). The exhaust valves 25 are operated by means of an overhead mounted exhaust camshaft 28 that is journaled in the cylinder head 15 and which operates the valves 25 through thimble tappets 29. Coil compression springs 31 urge the exhaust valves 25 to their closed positions.

A spark plug, indicated schematically at 31, is positioned centrally in the combustion chamber 19 generally on the plane 18 for firing the charge within the combustion chamber.

Figure 2:
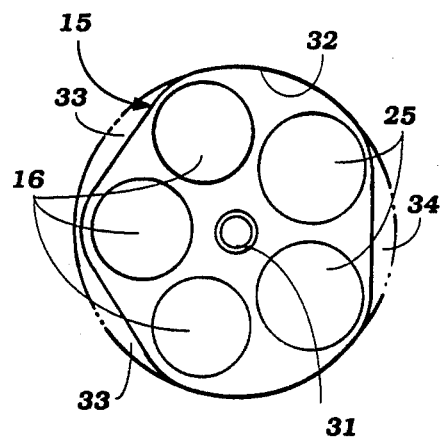
FIG. 2 is a cross-sectional view taken along the line 2—2 of FIG. 1 and shows the configuration of the combustion chamber recess in the cylinder head.
Figure 3:
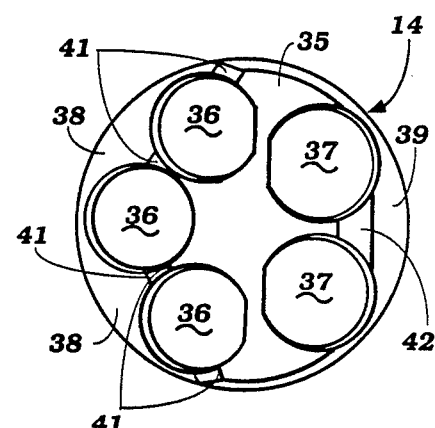
FIG. 3 is a cross-sectional view taken along the line 3—3 of FIG. 1 and shows the configuration of the head of the piston.
Figure 4:
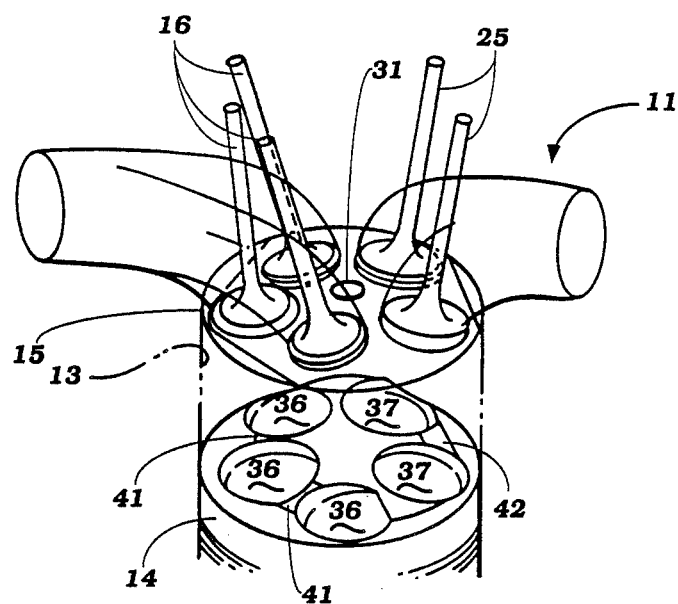
FIG. 4 is a perspective view of the combustion chamber configuration with certain of the components shown in phantom.

It should be noted that the combustion chamber 19 is formed by a domed recess 32 formed in the cylinder head 15, which domed recess has a configuration generally that of a modified letter D as best shown in FIG. 2. The recess 32 has a pair of angularly disposed flat squish areas 33 formed at an angle on the intake side adjacent the valves 16. In a similar manner, there is a squish area 34 formed on the exhaust valve side outwardly of the heads of the exhaust valves 25.

The head of the piston 14 is formed with a centrally domed portion 35 which cooperates with the cylinder head recess 32 to form a pent roof configuration combustion chamber. The piston head is also formed with recesses 36 to offer clearance volume for the valve heads 16. In a similar manner, recesses 37 are formed for clearance purposes with the exhaust valves 25. It should be noted that the intake valve recesses 36 are disposed so that they are each parallel to the heads of the intake valves 16. Since the outermost intake valve is at a different angle from the intake valves 16 closest to the plane 18, the piston head recesses 36 are also disposed at different angles to each other.

A pair of intersecting squish areas 38 are formed on the intake side of the piston 14 and cooperate with the cylinder head squish areas 33. In a like manner, an exhaust side squish area 39 cooperates with the cylinder head squish area 34. Boundary ridges 41 extend between the intake valve recesses 36 so as to offer a barrier to flow to provide the desired flow pattern. In a similar manner, a boundary ridge 42 extends between the outer peripheral edges of the exhaust valve recesses 37.

Figure 5:
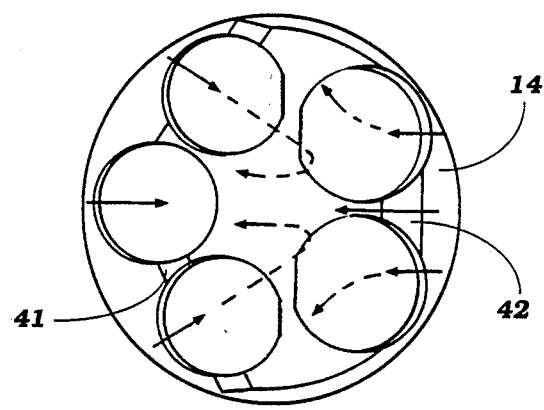
FIG. 5 is a top plan view, in part similar to FIG. 3 on an enlarged scale, and shows the flow of gases within the combustion chamber during the squish operation.

As may be best seen in FIG. 5, when the piston 14 approaches it top dead center position, the squish areas 38 and 33 will cooperate to provide a flow that extends toward the exhaust side of the combustion chamber but which generally is directed centrally between the exhaust valves 25 and the corresponding recesses 37 in the piston head. The flow from the exhaust gases will be in a generally opposite direction but because of the angle flow from the intake side, a swirl will be generated as shown by the arrows in FIG. 5. As a result, there is a controlled flow in the combustion chamber that adds to the turbulence and improves combustion efficiency. Because of the generally D shape of the piston dome and the angular relationship of the recesses 36, this flow will be much better controlled than with conventional pent roof combustion chambers.

The foregoing description has described the combustion chamber in conjunction with an engine having five valves per cylinder. It should be understood, of course, that the same configuration can be utilized with engines having different numbers of valves such as with four valves per cylinder engines.

The foregoing description is that of a preferred embodiment of the invention and various changes and modifications may be made without departing from the spirit and scope of the invention, as defined by the appended claims.

What is claimed is:

1. In a combustion chamber for an internal combustion engine comprised of a cylinder bore, a piston reciprocating in said cylinder bore, a cylinder head closing said cylinder bore and defining a combustion chamber with said cylinder bore and said piston, intake valve means on one side of said cylinder bore for admitting a charge to said combustion chamber, and exhaust valve means on the other side of said cylinder bore for discharging of combustion products from said combustion chamber, the improvement comprising said combustion chamber being comprised of a central portion having a pent roof configuration with a peripheral squish area and being configured that the squish flow upon approaching top dead center of said piston is such that the squish flow from one side of the cylinder bore is in a different direction than the squish flow from the other side of the cylinder bore and does not directly oppose the squish flow from the other side of the cylinder bore.

2. In a combustion chamber as set forth in claim 1 wherein the squish area comprises a pair of angularly related squish areas on one side of the combustion chamber and a squish area on the other side of the combustion chamber that extends generally parallel to a plane dividing the cylinder bore into the two sides.

3. In a combustion chamber as set forth in claim 2 wherein the combustion chamber is configured by a dome on the piston.

4. In a combustion chamber as set forth in claim 3 wherein the combustion chamber is further configured by a recess in the cylinder head.

5. In a combustion chamber as set forth in claim 1 wherein the head of the piston is formed with clearance recesses for the heads of the valves, the recesses lying substantially parallel to the heads of the respective valves but being angularly disposed relative to each other.

6. In a combustion chamber as set forth in claim 5 wherein the squish area comprises a pair of angularly related squish areas on one side of the combustion chamber and a squish area on the other side of the combustion chamber that extends generally parallel to a plane dividing the cylinder bore into the two sides.

7. In a combustion chamber as set forth in claim 6 wherein the combustion chamber is configured by a dome on the piston.

8. In a combustion chamber as set forth in claim 7 wherein the combustion chamber is further configured by a recess in the cylinder head.

9. In a combustion chamber as set forth in claim 8 wherein there are three intake valves on the side of the cylinder bore having the angularly related squish areas and two exhaust valves on the other side of the cylinder bore.

* * * * *